United States Patent [19]

Senger

[11] 4,032,919
[45] June 28, 1977

[54] DEVICE FOR SECANT CORRECTION OF AZIMUTH DATA IN TRACKING RADARS

[75] Inventor: Stephen J. Senger, Jamestown, N. Dak.

[73] Assignee: The United States of America as represented by the Secretary of the Navy, Washington, D.C.

[22] Filed: Aug. 11, 1976

[21] Appl. No.: 713,454

[52] U.S. Cl. .................................................. 343/7.4
[51] Int. Cl.² .......................................... G01S 9/02
[58] Field of Search ..................................... 343/7.4

[56] References Cited

UNITED STATES PATENTS 3,697,992  10/1972  Kleptz et al. .................. 343/7.4 X
3,719,949  3/1973  Hemmi .......................... 343/7.4 X Primary Examiner—T.H. Tubbesing
Attorney, Agent, or Firm—Richard S. Sciascia; Joseph M. St. Amand; William W. Cochran, II

[57] ABSTRACT

A device for electronically correcting detected traverse error data from a tracking radar antenna and receiver so that the azimuth error signal used to drive the positioning devices for the radar antenna are proportional to the true azimuth angular error. The traverse error signal produced by the radar is adjusted for various elevations by a correction factor which is generated from the detected elevation angle and proportional to the secant of that angle.

6 Claims, 2 Drawing Figures

DEVICE FOR SECANT CORRECTION OF AZIMUTH DATA IN TRACKING RADARS

BACKGROUND OF THE INVENTION

The present invention pertains generally to control systems and more particularly to antenna positioning in tracking radars. An important aspect of controlling antenna movement in tracking radars is correcting the traverse error signal as the elevation angle varies to obtain the proper azimuth postion of the tracking radar. The problem is produced by the fact that the traverse error signal produced by the radar tracking electronics is proportional to the traverse plane trajectory of the target being tracked. Although the traverse plane trajectories of two seprate targets, one at the horizon and the other at a very high elevation angle, such as 70°, require the same change in azimuth movement of the radar antenna, the traverse plane trajectory of the elevated target is much smaller than the traverse plane trajectory of the target on the horizon. Since the traverse error signal produced by the radar is proportional to the traverse plane trajectory detected by the radar, the azimuth error signal must be amplified as the elevation angle is increased to obtain the true azimuth error signal.

The ratio of angular displacement at high elevation to the displacement at the horizon (zero elevation) is equal to the cosine of the elevation angle. The true azimuth angular error is therefore equal to the traverse error detected by the receiver divided by the cosine of the elevation angle. Since the secant function is equal to 1/cosine, the true azimuth error signal is equal to the traverse error signal produced by the radar times the secant of the elevation angle. Therefore, the correction factor required to obtain the true azimuth angular error signal is proportional to the secant of the elevation angle, and this function must be approximated in some manner to produce the proper correction factor.

The conventional manner of generating the correction factor has been to mechanically connect a secant wound potentiometer to the vertical gear train of the radar antenna pedestal. The traverse error signal is then applied to the terminals of the potentiometer to produce the true azimuth angular error signal, since the output taken from the wiper of the pot varies in amplitude proportionally to the secant of the elevation angle.

While this type of system is very simple and straight-forward in concept, it suffers from various disadvantages and limitations. In operation, the secant pot must be physically located on the pedestal so that it is mechanically coupled to the antenna gear train. Since the traverse error signal is generated from the radar electronics which are physically separated from the antenna pedestal, the traverse error signal must be run over cable for long distances which tends to introduce noise resulting in poor tracking signals. Additionally, the error signal must be routed through slip rings in the pedestal which also add noise to the azimuth error signal.

Another problem with this type of system is that secant wound potentiometers are expensive and are becoming increasingly difficult to obtain. This results in extended "down-time" for the radar system if the potentiometers cease functioning.

As with most precision potentiometers, the functional accuracy of the secant potentiometer is only maintained when loaded with high impedance since, as the load resistance decreases, the functional error of the output increases. A cable between the radar electronics and the pedestal carrying the traverse error signal must therefore be terminated with a high impedance to maintain proper accuracy. The combination of a long line and high impedance, of course, renders the system more susceptable to noise pickup, even with the use of shielded cables. The signal-to-noise ratio is even further degraded by low error signal amplitudes typically encountered in the automatic track mode.

Finally, the design of the potentiometer itself introduces other disadvantages and limitations. For example, the movement of the wiper across the wire windings produces both electrical noise and mechanical wear. The performance of the potentiometer is slowly degraded by this wear as well as environmental factors due to the location of the potentiometer on the pedestal. The performance of the system eventually reaches unacceptable levels requiring placement of the secant potentiometer at a substantial cost.

SUMMARY OF THE INVENTION

The present invention overcomes the disadvantages and limitations of the prior art by providing an electronic secant correction device. The device detects the elevation angle information provided by synchros from the pedestal and ajusts the traverse error input signal by a correction factor proportional to secant of the elevation angle.

It is therefore an object of the present invention to provide an improved secant correction device for tracking radars.

It is also an object of the present invention to provide a secant correction device in tracking radars which has high reliability and maintainability.

Another object of the present invention is to provide a secant correction device for tracking radars which is highly accurate in operation.

Another object of the present invention is to provide a secant correction device for tracking radars which has an enhanced signal-to-noise ratio and is inexpensive to implement.

Other objects and futher scope of applicability of the present invention will become apparent from the detailed description given hereinafter. The detailed description, indicating the preferred embodiment of the invention, is given only by way of illustration since various changes and modifications within the spirit and scope of the invention will become apparent to those skilled in the art from the detailed description. The foregoing abstract of the disclosure is for the purpose of providing a non-legal brief statement to serve as a searching and scanning tool for scientists, engineers and researchers and is not intended to limit the scope of the invention as disclosed herein nor is it intended to be used in interpreting or in any way limiting the scope or fair meaning of the appended claims.

DETAILED DESCRIPTION OF THE PREFERRED EMBODIMENT

Figure 1:
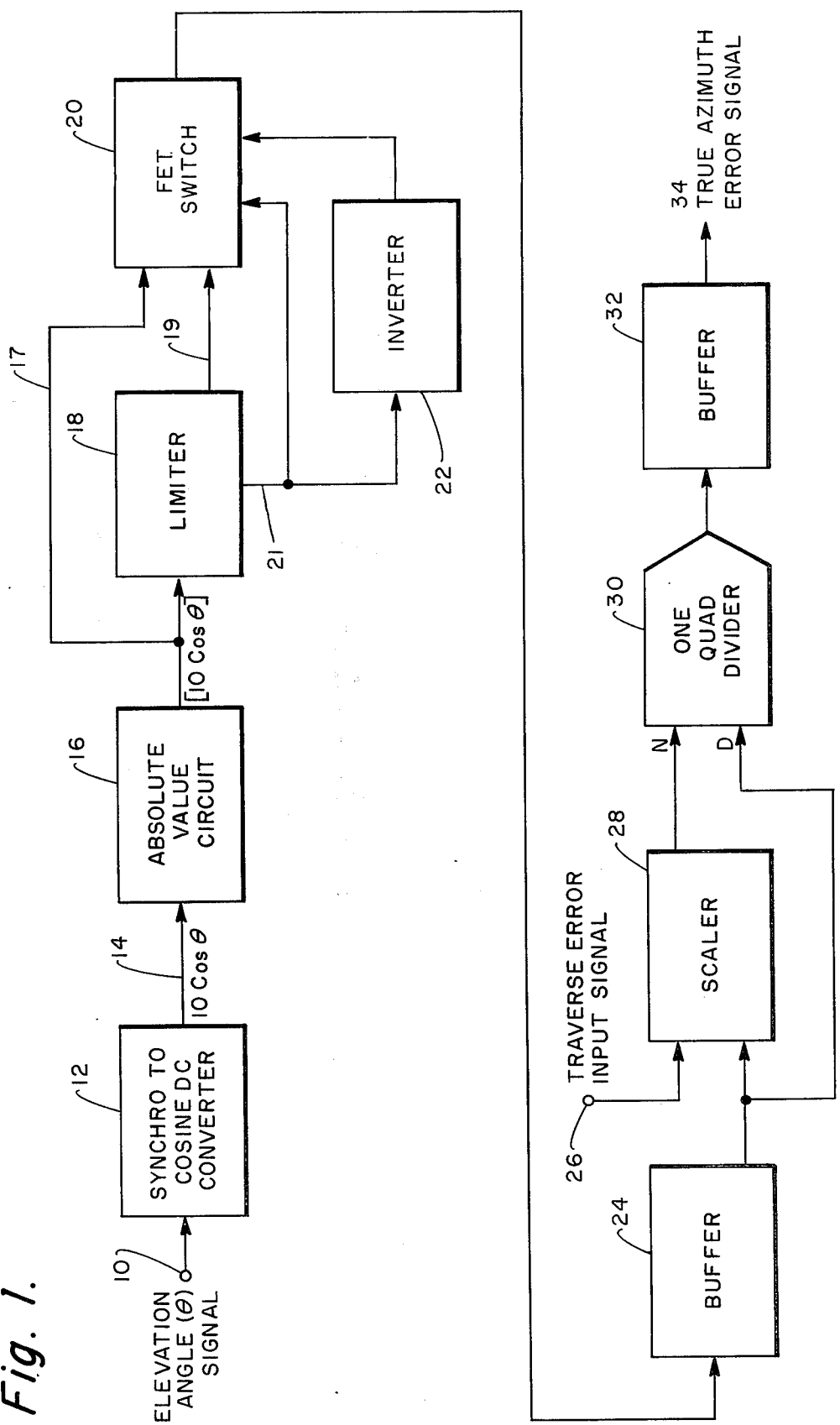
FIG. 1 is a block diagram of the preferred embodiment of the invention.

FIG. 1 illustrates, in block diagram form, the functional operation of the preferred embodiment. Elevation angle information is obtained from a one-to-one speed synchro buss attached to the pedestal of the radar antenna. The signal is fed through the input 10 to a synchro to cosine D.C. converter where the angular information is converted to a D.C. output signal, which is proportional to the cosine of the elevation angle scaled by a factor of 10. The output of the converted 12 is appllied along line 14 to the absolute value circuit 16 to obtain the absolute value of 10 cosine $\theta$ ($|10 \cos \theta|$) at its output. This signal is applied to both a limiter 18 and a FET switch 20. The limiter 18 functions to hold its output 19 constant for values of $\theta$ greater than a predetermined elevation angle such as 75°. This constant output, produced on line 19, is applied to the FET switch 20. Output line 21 constitutes a signal for controlling the state of the FET switch 20. Inverter 22 provides the complement of the signal produced on line 21 so that the FET switch operates in an alternate manner (single pole, double throw operation).

In operation, whenever an elevation angle detected is greater than the predetermined angle such as 75°, the limiter produces a constant output on line 19 which is conducted through FET switch 20 in response to the control signal produced at output 21. At elevation angles below 75°, the FET switch functions to pass the absolute value of 10 cosine $\theta$ provided along line 17.

Buffer 24 provides signal conditioning between the FET switch 20 and scaler 28. Scaler 28 functions to adjust the traverse error input signal by a scaling factor to assure a positive signal at its output. One quad divider 30 provides the division necessary to produce the secant function from the cosine function provided by the other circuitry and applies this correction factor to the traverse error signal. Output buffer 32 provides signal conditioning to produce the true azimuth error signal 34.

Figure 2:
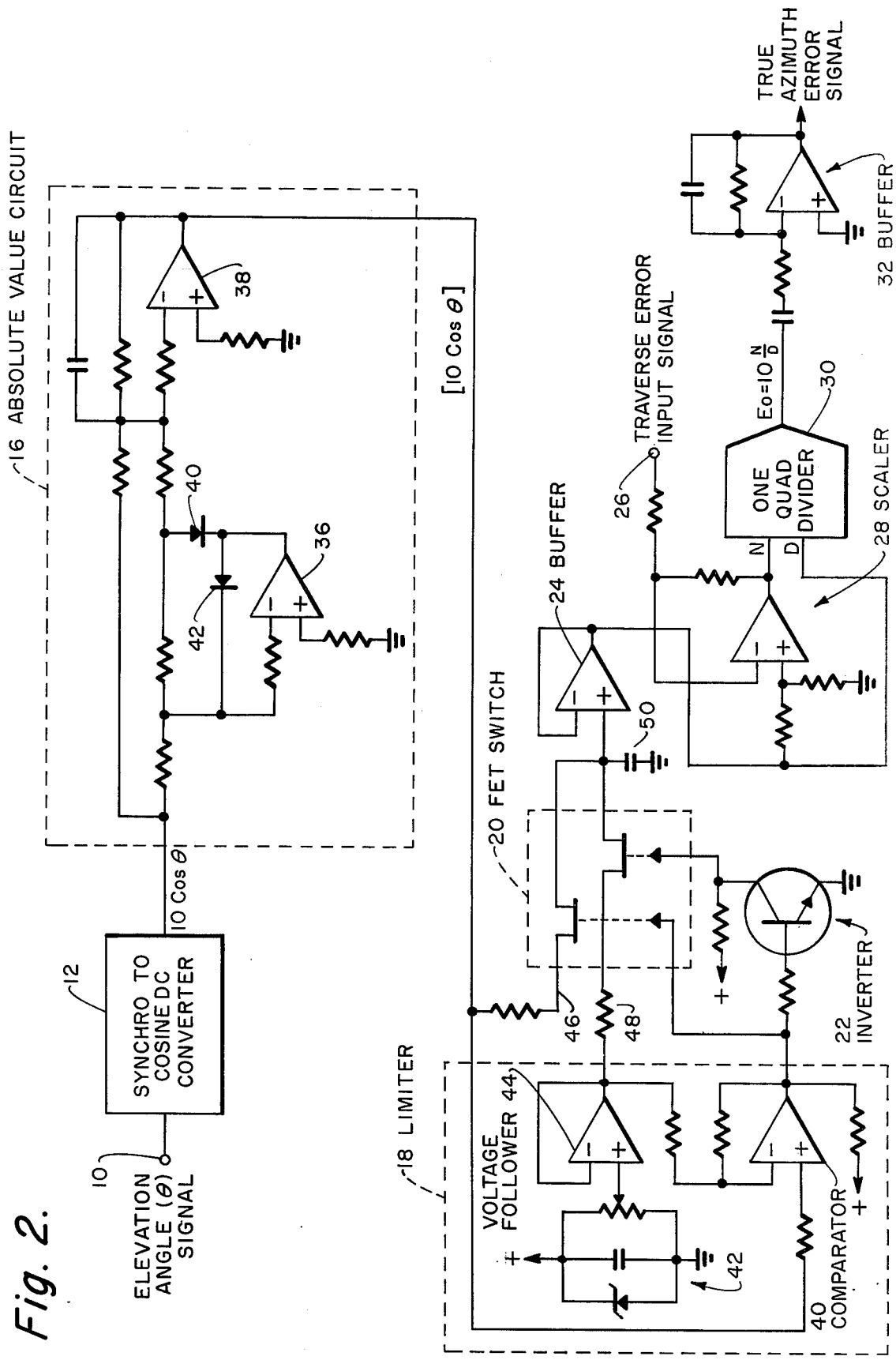
FIG. 2 is a schematic diagram of the preferred embodiment of the invention.

FIG. 2 discloses a modified schematic diagram of the preferred embodiment of the invention. As shown therein, the elevation angle signal is applied to input 10 of the synchro to cosine D.C. converter 12. The synchro to cosine converter functions to convert the A.C. signal, representative of elevation angle, to a D.C. voltage which is proportional to the cosine of the elevation angle $\theta$. Converter 12 uses reference input signals to compensate for changes in both amplitude and frequency of the synchro excitation voltage. The output of the converter 12 is a signal representative of ten times the cosine of the elevation angle $\theta$, which is applied to an absolute value circuit 16. The absolute value circuit 16 comprises two operational amplifier stages (op amp) 36 and 38. For positive inputs, op amp stage 36 acts simply as a unity gain inverter since diode 40 is conducting while diode 42 is reverse biased. For negative inputs, the output of op amp stage 36 is zero. This stage therefore performs the function of a precision half wave rectifier with a gain of -1. Since the diodes 40 and 42 are placed in the feedback loop, their non-linearities are reduced by the loop gain of the amplifier which is very large. Hence, the diodes behave nearly as ideal diodes and signals in the low milli-volt range can be accurately rectified. Op amp stage 38 functions basically as a summing amplifier so that the two stages together, when combined as shown, form a precision absolute value circuit.

The output signal, $|10 \cos \theta|$, is then applied to both the limiter 18 and FET switch 20. Since the secant function approaches infinity as the elevation angle $\theta$ approaches 90°, it is necessary to limit the gain of the circuitry to a reasonable value to avoid various problems and electronic device limitations encountered when driving the antenna at higher elevation angles. The maximum elevation angle selected in the preferred embodiment is 75°. The function of limiter circuitly 18 is to limit the cosine function for angles above 75° by producing a reference voltage signal equal to $|10 \cos \theta|$ when $\theta$ equals 75°.

The limiter circuit 18 comprises a comparator 40, a tank circuit 42 and a voltage follower 44. The tank circuit 42 produces a reference voltage source equivalent to the input cosine function at 75°. Voltage follower 44 adjusts the impedance and acts as a buffer circuit. The reference voltage produced by voltage follower 44 is applied to the positive input of comparator 40 while the cosine function from the absolute value circuit 16 is applied to the negative input. As long as the voltage produced by the absolute value circuit 16 is greater than the voltage produced at the output of voltage follower 44, the output of the comparator is low. When the voltage at the output of absolute value circuit 16 drops below the voltage produced at the output of voltage follower 44, the output of the comparator goes high. The comparator output, along with its complement, which is derived from the inverter circuit 22, are applied to the input control drivers of the dual channel FET switch 20. Since the output of the inverter and the output of comparator 40 are always 180° out of phase, only one of the FET channels is selected at any given time.

The two imputs to the FET switch 20 comprise the cosine function signal and the reference voltage. In operation, whenever $\theta$ is less than 75°, the FET switch 20 will conduct the cosine function from input 46. When $\theta$ exceeds 75°, the reference voltage is conducted by FET switch 20 from input 48. Since the outputs of FET switch are tied together, a function is produced at the output of FET switch 20 which follows the cosine of the elevation angle to a limit of 75°, at which point a constant voltage equivalent to the signal produced at 75° is produced. This signal, representative of this limiting function, is buffered by voltage follower 24 and tied to capacitor 50 to keep the output steady while the FET switch 20 changes state.

Scaler 28 provides adjustment for the traverse error input signal 26 dervied from the radar electronics. As previously indicated, the traverse error signal is a signal provided by the radar tracking electronics which indicates azimuth traverse error. To properly track at elevations above the horizon, this signal must be adjusted by the secant function due to the inherent geometries encountered in radar tracking. The traverse error input signal 26 is adjusted by the scaler 28 to provide a positive input to the numerator input (N) of one quad divider 30. The denominator input (D) is derived from the output of buffer 24 corresponding to the function generated by the previously disclosed circuitry. By dividing by the cosine function, the traverse error input signal is effectively multiplied by the modified secant function produced at the output of buffer 24. A scaling factor of 10 in the one quad divider 30 eliminates the ten multiplier previously introduced. Output buffer 32 eliminates D.C. components introduced by previous stages and provides final gain scaling and filtering of the output signal.

The correction factor, proportional to the secant of the elevation angle, has therefore been used to adjust the traverse error input signal to provide a true azimuth error signal limited to elevation angles of as high as 75°. The device provides a highly reliable and accurate system for secant correction in tracking radars. It is highly maintainable and further provides improved signal-to-noise ratio due in part to the replacement of electro-mechanical parts with solid state devices which can be easily maintained and repaired without the necessity for calibrations. In fact, the only adjustable component is the potentiometer in tank circuit 42, which is used to limit the maximum value for the secant function thereby providing a great amount of flexibility in selecting a limiting value.

Obviously many modifications and variations of the present invention are possible in light of the above teachings. It is therefore to be understood that within the scope of the appended claims the invention may be practiced otherwise than as specifically disclosed herein.

What is claimed is:

1. A device for adjusting traverse error signals in a tracking radar to obtain a true azimuth error signal comprising:
   a. means for converting a signal representative of elevation angle of said tracking radar to a signal proportional to the cosine of said elevation angle;
   b. means for limiting said signal proportional to the cosine of said elevation angle to a minimum value representative of a maximum elevation angle to produce a correction factor signal;
   c. means for dividing said traverse error signals by said correction factor signal to obtain said true azimuth error signal.

2. The device of claim 1 further comprising means for obtaining a signal representative of absolute value of said signal proportional to the cosine of said elevation angle.

3. The device of claim 2 wherein said means for obtaining a signal representative of absolute value comprises a unity gain inverter and a summing amplifier.

4. The device of claim 3 wherein said means for limiting comprises:
   a. means for producing a reference voltage signal;
   b. means for comparing said reference voltage signal with said signal representative of absolute value of said signal proportional to the cosine of said elevation angle to produce a control signal;
   c. switching means for conducting said reference voltage signal whenever said reference voltage signal exceeds said signal representative of absolute value of said signal proportional to the cosine of said elevation angle, and said signal representative of absolute value of said signal proportional to the cosine of said elevation angle whenever the same exceeds said reference voltage signal, in response to said control signal produced by said means for comparing.

5. The device of claim 2 wherein said means for limiting comprises:
   a. means for producing a reference voltage signal
   b. means for comparing said reference voltage signal with said signal representative of absolute value of said signal proportional to the cosine of said elevation angle to produce a control signal;
   c. switching means for conducting said reference voltage signal whenever said reference voltage signal exceeds said signal representative of absolute value of said signal proportional to the cosine of said elevation angle, and said signal representative of absolute value of said signal proportional to the cosine of said elevation angle whenever the same exceeds said reference voltage signal, in response to said control signal produced by said means for comparing.

6. The device of claim 1 wherein said means for limiting comprises:
   a. means for producing a reference voltage signal;
   b. means for comparing said reference voltage signal with said signal proportional to the cosine of said elevation angle to produce a control signal;
   c. switching means for conducting said reference voltage signal whenever said reference voltage signal exceeds said signal proportional to the cosine of said elevation angle, and said signal proportional to said angle whenever the same exceeds said reference voltage signal, in response to said control signal produced by said means for comparing.

* * * * *